United States Patent
Su et al.

(10) Patent No.: US 9,902,503 B2
(45) Date of Patent: Feb. 27, 2018

(54) SYSTEM AND METHOD FOR INSPECTING AND VALIDATING FLIGHT PROCEDURE

(71) Applicant: FLIGHT INSPECTION CENTER OF CAAC, Beijing (CN)

(72) Inventors: Wei Su, Beijing (CN); Yangting Ou, Beijing (CN); Gang Wei, Beijing (CN); Kun Liu, Beijing (CN); Yachao Yu, Beijing (CN); Tao Chen, Beijing (CN)

(73) Assignee: FLIGHT INSPECTION CENTER OF CAAC, Beijing (CN)

( * ) Notice: Subject to any disclaimer, the term of this patent is extended or adjusted under 35 U.S.C. 154(b) by 153 days.

(21) Appl. No.: 14/904,425

(22) PCT Filed: Jul. 10, 2014

(86) PCT No.: PCT/CN2014/081959
§ 371 (c)(1),
(2) Date: Jan. 11, 2016

(87) PCT Pub. No.: WO2015/003642
PCT Pub. Date: Jan. 15, 2015

(65) Prior Publication Data
US 2016/0144979 A1    May 26, 2016

(30) Foreign Application Priority Data

Jul. 12, 2013   (CN) .......................... 2013 1 0292905
Aug. 23, 2013   (CN) .......................... 2013 1 0370584

(51) Int. Cl.
*B64D 47/08*   (2006.01)
*G01C 23/00*   (2006.01)
(Continued)

(52) U.S. Cl.
CPC ............. *B64D 47/08* (2013.01); *G01C 23/00* (2013.01); *G08G 5/0073* (2013.01); *G08G 5/04* (2013.01);
(Continued)

(58) Field of Classification Search
None
See application file for complete search history.

(56) References Cited

U.S. PATENT DOCUMENTS

2004/0160340 A1 * 8/2004 Thomson ........... B64D 45/0015
340/945
2005/0149238 A1 * 7/2005 Stefani ................... G01D 9/005
701/33.4
(Continued)

FOREIGN PATENT DOCUMENTS

CN    102419171 A    4/2012
CN    102867073 A    1/2013
(Continued)

OTHER PUBLICATIONS

International Search Report of international PCT application No. PCT/CN2014/081959, dated Oct. 20, 2014.

*Primary Examiner* — Eileen Adams
(74) *Attorney, Agent, or Firm* — J.C. Patents

(57) ABSTRACT

The present invention relates to a system and method for inspecting and validating a flight procedure used in the field of civil aviation. The system comprises an image capturing apparatus, a storage device, a playing device, a recorder such as QAR, a data processing module and a synchronization module; the method for inspecting and validating a flight procedure applied in the system includes the following steps: collecting actual visual videos and flight parameters, generating simulation visual videos, generating over-limit alarms, processing data, generating complex simulation visual videos, generating flight trajectory and flight proce-
(Continued)

dure protection area pictures, and synchronizing and playing the videos. With the application of the system and the method, the defects of the prior art can be overcome, artificial sensory factors are more avoided, the general condition of an aircraft itself at each time point during the execution of the flight procedure are accurately reflected, and objective and accurate references are provided for designers and approvers of the flight procedure.

8 Claims, 3 Drawing Sheets

(51) Int. Cl.
*G09B 9/08* (2006.01)
*G09B 9/24* (2006.01)
*G09B 19/16* (2006.01)
*G08G 5/00* (2006.01)
*G08G 5/04* (2006.01)

(52) U.S. Cl.
CPC ............... *G09B 9/08* (2013.01); *G09B 9/24* (2013.01); *G09B 19/165* (2013.01)

(56) References Cited

U.S. PATENT DOCUMENTS

| | | |
|---|---|---|
| 2007/0020588 A1 | 1/2007 | Batcheller |
| 2012/0188452 A1* | 7/2012 | Keiser .................... G06T 13/00 348/559 |
| 2013/0162632 A1* | 6/2013 | Varga .................... G06T 19/006 345/419 |

FOREIGN PATENT DOCUMENTS

| | | |
|---|---|---|
| CN | 103400018 A | 11/2013 |
| WO | 2012/044297 A1 | 4/2012 |

* cited by examiner

SYSTEM AND METHOD FOR INSPECTING AND VALIDATING FLIGHT PROCEDURE

TECHNICAL FIELD

The present invention relates to a system and method for inspecting and validating flight procedure which is a system and method applied in the field of civil aviation and using electronic apparatus to collect and process information.

BACKGROUND ART

A flight procedure describes aircraft flight routes, and contains all communication and navigation information needed for air navigation. The flight procedure is also one of the important foundations for the airport to provide operation support and air traffic services, and is also one of the important bases for the airport to construct navigation facilities and determine operational standards as well. Therefore, the quality of a flight procedure directly determines airport safety operation level and operation efficiency, especially in the days when China's economic construction and t the civil aviation industry develops rapidly. The design of a flight procedure needs to consider many factors, such as urban construction, spatial environment, obstacle free airspace, flight traffic flow, and flight normality, etc. Higher requirements are placed on the design quality and daily operation of a flight procedure. How to take better technology means to test the safety level of a flight procedure has become an important proposition in the civil aviation industry.

At present, the key points for the flight procedure checkout and verification are safety evaluation, flight ability evaluation, and human factor evaluation. Wherein the key point for the safety evaluation is in that whether the aircraft can safely fly over all obstacles or not; the key point for the flight ability evaluation is in that whether sufficient communication, navigation and navigational-aiding signals are available for supporting the continuous completion of the whole procedure or not; and the key point for the human factor evaluation is in that whether a pilot as a trained person can complete the flight or not by using the specific aircraft and according to the flight procedure.

At present, the safety evaluation is carried out by checking the practical flight of the pilot, in reference with an obstacle chart of the flight procedure, and visually checking that whether all the obstacles are consistent with the description of the obstacle chart or not. Whether the flight procedure is safe or not, the most important requirement is that the flight procedure can guide the aircraft to fly over the obstacles at a suitable height. The main checking means used at present is the sensory judgment of the pilot, which is largely dependent on the sensory factor of a person, but is lack of a reliable apparatus or device as the objective flight check tool, and the comprehensive recording, playback and evaluation means. This causes the result that the validation result is overly dependent on the experience and the subjective perception of the validation pilot, on one hand, the probability of error exists, on the other hand, the risk of nonuniform mastering for the standard exists, and the validation results made for the same flight procedure by different persons may be inconsistent. And no image video records of the obstacles are available in the range of the flight procedure, whether an additional obstacle exists in the region or not is determined merely depending on the memory of the pilot, and large uncertainty exists, and therefore, great difficulties are caused to determination of the obstacles in the air and the clearance protection work of an airport.

In the existing methods for inspecting and validating a flight procedure, the flight procedure is executed through the practical fight of a flight inspection, and whether sufficient communication, navigation and navigation-aiding signals for supporting are available or not in the whole flight process is checked. At present, for the operation parameters of the aircraft in the whole flight process, the basic three-dimensional animation simulation reproduction is realized through software, on one hand, the three-dimensional animation is lack of the detailed information of the obstacles, the artificial building and the lighting environment, and no flight practical images are available for confirming the truth of the three-dimensional animation; on the other hand, the three-dimensional animation only reproduces the practical flying state of the aircraft through simulation, no comparison with the design scheme of the flight procedure and the design specification of the flight procedure is available, and no alarm of exceeding the tolerance during practical flight is available. Moreover, for the flight procedure design examination and approval personnel, the recognition and judgment for the specific situation of the flight ability of the flight procedure only originate from design rules and the checking flight validation report and charts, and are lack of objective and comprehensive video record as the judgment basis. The human factor evaluation at present mainly originates from the postflight report of the validation pilot, the flight procedure examination and approval personnel of the civil aviation administration cannot obtain the intuitive perception about whether the flight procedure is overly complicated and has difficulty in performing or not merely depending on the report.

SUMMARY OF THE INVENTION

In order to solve the problems in the prior art, the invention provides a system and method for inspecting and validating a flight procedure; with the adoption of the system and the method, synchronous playing of objective and actual flight videos and a series of simulation videos can be realized, the alarm of exceeding the tolerance of the aircraft during the actual flight is obtained, and the safety evaluation, the flight ability evaluation, and the human factor evaluation for the flight procedure can be obtained based on the judgment of the videos and the presence of the alarm.

The detailed solution of the invention is as follow:

A system for inspecting and validating a flight procedure, comprising an image capturing apparatus, a storage device, a playing device, and data recorder such as a QAR (Quick Access Recorder), the system is further provided with a data processing module for processing flight data extracted by the QAR and a synchronization module for synchronizing video files temporally; the image capturing apparatus is equipped on an aircraft, and is connected with the acquisition and storage device; the QAR is connected with the data processing module; the acquisition and storage device and the data processing module are connected independently with the synchronization module, the synchronization module being connected with the playing device.

A method for validating a flight procedure applied in the system for inspecting and validating a flight procedure, the method comprises the step of collecting actual visual videos and flight parameters, the step of generating simulation visual videos, the step of generating over-limit alarms, the step of processing data, the step of generating complex simulation visual videos, the step of generating flight trajectory and flight procedure protection area pictures, the step of synchronizing the videos, and the step of playing the videos;

in the step of collecting actual visual videos and flight parameters, actual flight is carried out at an actual location according to a pre-designed flight procedure; during the flight, the image capturing apparatus in the system stores the captured actual visual videos into the storage device, and meanwhile, data recorder records various flight parameters;

in the step of generating simulation visual videos, the data processing module in the system extracts the flight parameters recorded in data recorder, decoding processing software of data recorder makes simulation videos of actual flights of the aircraft, and the actual flight parameters are embedded in the simulation videos, so that the flight parameters are visible in the video;

in the step of generating over-limit alarms, the data processing module in the system extracts the flight parameters recorded in data recorder, the actual flight parameters are compared with standard parameters preset in the flight procedure, alarms are generated by the flight parameter alarm function of the decoding processing software of data recorder, and the alarms are embedded into simulation videos, so that the alarm are visible in the simulation visual videos;

in the data processing step, the data processing module generates, by the decoding processing software of data recorder, video source data packets used for making composite flight simulation videos and image source data packets used for processing and generating 3D images by software Google Earth or other software;

in the step of generating composite simulation visual videos, the data processing module in the system extracts the video source data packets, and the composite simulation visual videos with view angles adjustable are generated by simulation flight software;

in the step of generating flight trajectory and flight procedure protection area pictures, the data processing module in the system extracts the image source data packets, 3D image files with the actual flight trajectories are generated by software Google Earth or other software, and the protection areas set in the flight procedure are marked in the 3D image to generate pictures containing the actual flight trajectories and the flight procedure protection areas; in the synchronization step, the synchronization module synchronizes the actual visual videos, the simulation visual videos and the composite simulation visual videos temporally, and selects the flight trajectory and the flight procedure protection area pictures output by the software Google Earth or other software in the time period corresponding to that of the abovementioned three videos;

in the playing step, the actual visual videos, the simulation visual videos, the composite simulation visual videos and the simulation visual pictures temporally synchronized by multi-path video player software are simultaneously played.

In the above steps, the video source data packets generated by the data processing module in the data processing step are data packets used for making a 3D dynamic video by Xplane software or other software.

In the above steps, the time system used in the synchronization step is a GPS time system, and the synchronization module extracts GPS time and local time parameters in the videos, and the starting points of the videos or the images are adjusted according to the parameters to realize the synchronization of the videos or the images.

The effects which can be achieved by adopting the system and the method are as follows:

The system captured actual visual scene videos which can objectively reflect real external environments in a flight process; the system generated simulation videos of actual flight, which visualize all flight parameters, and objectively reflect the running conditions of an aircraft itself in a flight procedure execution process; the system generated flight parameter over-limit alarm and embedded the alarm in the simulation videos, so that the alarm is visible in the videos; the system generated the visual angle selectable composite simulation visual scene videos of the actual flight, which objectively reflect the simulation flight conditions and external environments of the aircraft from different angles; the system generates simulation visual scene images which objectively reflect flight trajectories and flight procedure protection areas of the aircraft; and the system realized the synchronized playing of the above-mentioned images, which accurately reflects the comprehensive conditions of the aircraft during flight procedure execution at various time points and provides objective and accurate references for designer and approvers of the flight procedure.

DETAILED DESCRIPTION OF THE INVENTION

Embodiment 1

Figure 1:
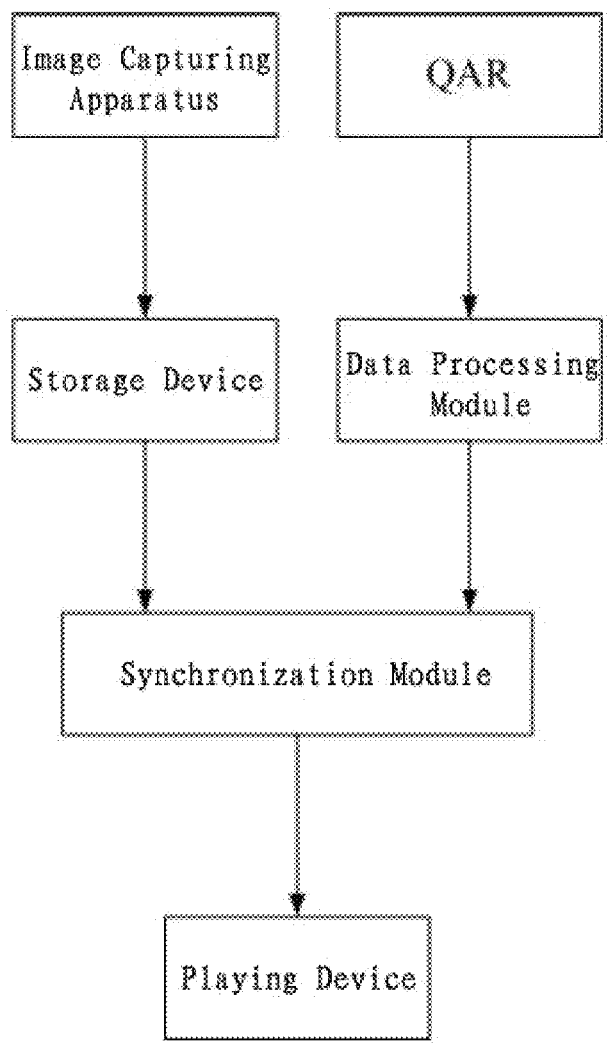
FIG. 1 is a schematic view of the system of the invention.

As shown in FIG. 1, the flight procedure inspecting and validating system used in the embodiment comprises an image capturing apparatus, a storage device, a playing device, and a QAR (quick access recorder) and is further provided with a data processing module for processing flight data extracted by the QAR and a synchronization module for synchronizing video files in time; the image capturing apparatus is arranged on the aircraft, and connected with an acquisition and storage device; the QAR is connected with the data processing module; the acquisition and storage device and the data processing module are respectively connected with the synchronization module, and the synchronization module is connected with the playing device. Due to limitations and regulations of industries, only the image capturing apparatus and QAR in the system are arranged on the aircraft, other devices and modules are not directly arranged on the aircraft and are connected with the aircraft by adopting mobile storage devices or wireless network.

More specifically, the flight procedure inspecting and validating system of the embodiment, comprises the image capturing apparatus, the image acquisition and storage device, the playing device, a data processing server in which the data processing module and the synchronized playing module are stored, and the QAR, and further comprises a first display screen for displaying actual flight path images captured by the image capturing apparatus, a second display screen and a third display screen which are used for displaying simulation flight path images generated from flight data recorded by the aircraft recorder, and a fourth display screen for displaying two-dimensional pictures of the simulation flight path images. The image capturing apparatus is arranged on the aircraft and is connected with the image acquisition and storage device, the image acquisition and storage device and the QAR are respectively connected with the data processing server which is connected with the displaying device, and the displaying device is respectively connected with the first display screen, the second display screen, the third display screen and the fourth display screen.

Further, the third display screen displays the composite flight simulation videos generated by processing through Xplane software, and the fourth display screen displays the simulation videos of 3D images generated by processing through software Google Earth.

Further, the first display screen, the second display screen, the third display screen and the fourth display screen are arranged on the same wall.

The video capturing apparatus used in the embodiment is a professional camera which may be installed in the front of a cockpit of an aircraft or installed at other appropriate positions for the purpose of collecting images, identical with a driver's sightline and capable of recording flight environment; the storage device is a mobile storage device, such as a hard disk drive; the QAR, namely a quick access recorder, is an on-board device, used for monitoring and recording huge amounts of flight parameters and data, having a generally 128 MB recording capacity, capable of recording continuously for up to 600 hours, and capable of collecting hundreds of data at the same time, including most of flight quality parameters of the aircraft, an air operator, by the aid of the QAR, may simulate and restore a flight process, find, in the flight process, conditions of the aircraft and problems in terms of crew operation, engine operating conditions, aircraft performance and the like in time, run analysis and searching on causes of abnormalities, master safety trends, and take corresponding measures, thereby eliminating potential accidents such as flaws in the flight procedure and ensuring flight safety; at present, most of civil aircrafts are fitted with this monitoring apparatus.

the data processing module functions in generating videos mainly through a combination of three programs, namely, a QAR decoding program, a flight simulation program and a virtual globe program Google Earth. The QAR decoding program used in the embodiment is Aerobytes FDM (version 3.2) by Aerobytes, this program is capable of generating flight simulation videos with quantitative indicators, generating flight parameter over-limit warnings, generating data packets of 3D images processed and generated by the software Google Earth, generating data packets of composite flight simulation videos processed by software such as Xplane, and generating icon files with respect to flight data; the flight simulation program is a simulation flight procedure Xplane made by the game developer Austin Meyer and used for real and virtual flight training, and this program is capable of producing simulation scenes and multi-view simulation flight animations according to given data; the Google Earth virtual globe program is virtual globe software developed by Google, this software is capable of arranging satellite photos, aerial photos and GIS (geographic information system) on a three-dimensional model of earth, uses pictures of public areas, permitted aerial photographic pictures, pictures by the satellite KeyHole and town photos taken by many other satellites and even provide pictures that Google Maps are in the absence of, and this software has a data importing function, a flight route planning function and a global positioning function.

The synchronization module functions in synchronizing four images through a synchronizing program, the actual visual videos collected by the video capturing apparatus have local time parameters with an accuracy of second, the simulation visual videos and composite simulation visual videos generated by the data processing module have GPS time parameters with an accuracy of second, and the synchronizing program extracts the time parameters which the three types of videos bear and acquires excerpts of the three types of videos according to selected starting and ending time; picture source data packets which the QAR decoding software outputs to the software Google Earth are data of GPS time parameters with an accuracy of second, and the software Google Earth may be used to acquire excerpts of pictures of aircraft flight paths according to the selected starting and ending time; the synchronizing program synchronizes the starting and ending times of the four types of images.

The playing device plays the four types of images simultaneously on a display through multi-channel video playing software.

Embodiment 2

Figure 2:
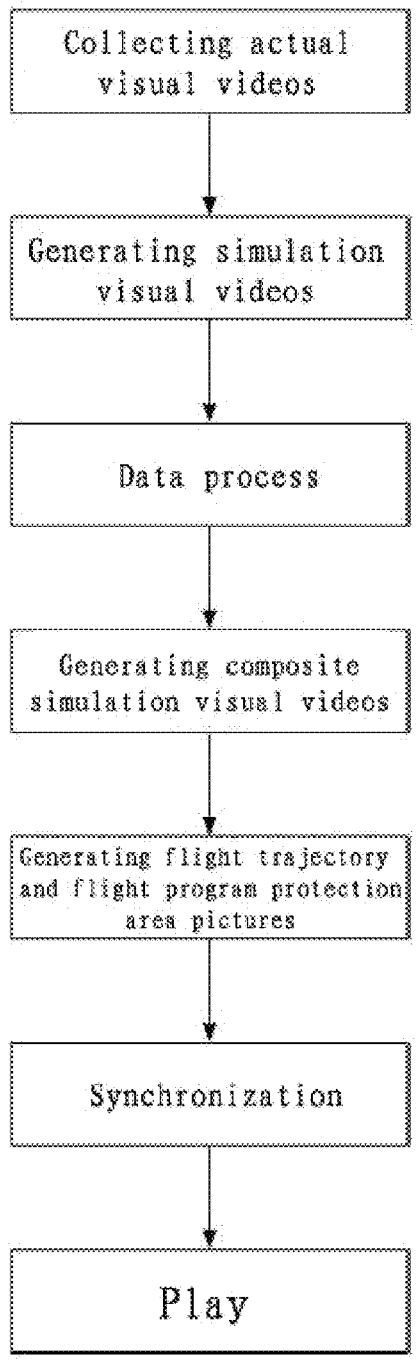
FIG. 2 is a flow diagram of the method of the invention.
Figure 3:
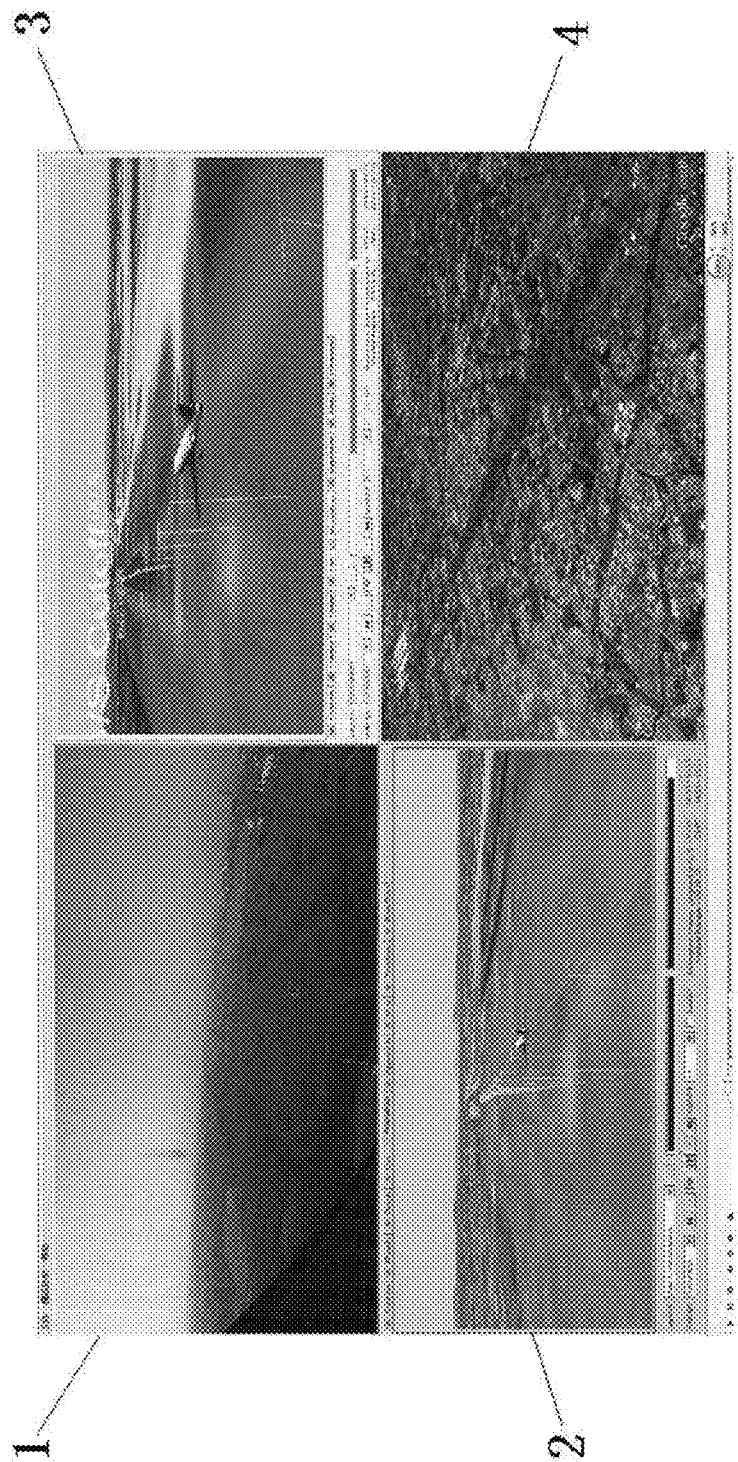
FIG. 3 is an schematic diagram of the effect of the invention.

In conjunction with FIGS. 2 and 3, a method for validating a flight procedure applied in the system for inspecting and validating a flight procedure of embodiment 1; the content disclosed in embodiment 1 should also be regarded as the content disclosed in this embodiment; the method comprises the step of collecting actual visual videos and flight parameters, the step of generating simulation visual videos, the step of generating over-limit alarms, the step of processing data, the step of generating complex simulation visual videos, the step of generating flight trajectory and flight procedure protection area pictures, the step of synchronizing the videos and the step of playing the videos; wherein:

the step of collecting an actual visual video and flight parameters is a step of collecting the actual visual video 1 in FIG. 3, in this step, an actual flight is performed in an actual location according to the pre-designed flight procedure; during the flight, the image capturing apparatus in the system stores the captured actual visual video into the storage device, and simultaneously QAR records various flight parameters.

The step of generating simulation visual videos is a step of generating the simulation visual video 2 in FIG. 3; in this step, the data processing module in the system extracts the flight parameters recorded in the data recorder such as QAR, a simulation video of flight of the aircraft are made by software such as QAR decoding processing software, and the actual flight parameters and the flight parameters in the flight procedure are embedded in the simulation video, such that the two kinds of flight parameters are visible in the videos at the same time; this step is a step of using QAR decoding processing software Aerobytes FDM to make a basic flight video, but the image quality of the video made is modest, and cannot fully reflect the environmental factors, but can clearly reflect the flight altitudes and poses and the like of the aircraft itself. Wherein the function of making the aircraft flight simulation video having flight parameters by the QAR decoding processing software Aerobytes FDM according to the data recorded by QAR belongs to the prior art.

The step of generating over-limit alarms is a step of generating the over-limit alarm in the simulation visual video 2 in FIG. 3; in this step, the data processing module in the system extracts the flight parameters recorded in the QAR, an alarm is generated with the flight parameter alarm function of the QAR decoding processing software, and the alarm is embedded in the simulation video, so that the alarm is visible in the video. Wherein the function of generating over-limit alarms by the QAR decoding processing software Aerobytes FDM according to the data recorded by QAR and the preset alarm tolerance belongs to the prior art.

In the data processing step, the data processing module generates, via QAR decoding processing software, video source data packets used for making composite flight simulation videos and image source data packets used for processing and generating 3D images by software Google Earth; this step is a process of using QAR decoding processing software Aerobytes FDM to process data, the processed data packages are data sources required for generating videos in the next step. Wherein the function of generating data source packets matched with the software such as Xplane, Google Earth and the like by the QAR decoding processing software Aerobytes FDM belongs to the prior art.

The step of generating the simulation visual videos is a step of generating the simulation visual video 3 in FIG. 3; in this step, the data processing module in the system extracts the video source data packets and generates view-adjustable composite simulation videos by a simulation flight software; this step is a process of using Xplane software to produce high-quality, multi-view flight animations, this video can reflect comprehensive situations of the flight more clearly, details about the aircraft itself, state of the surrounding buildings and topographical conditions and the like are included in the image.

The step of generating flight trajectory and flight procedure protection area pictures is a step of generating the flight trajectory and flight procedure protection area picture 4 of FIG. 3; in this step, the data processing module in the system extracts an image source data packet, and generates a 3D map picture with the flight path of the aircraft through the data importing function of software Google Earth; the software Google Earth has the function of planning the flight route, and a protection area of the flight procedure can be drawn on the picture through the function of planning the flight route. In the picture, besides the map information, the protection area of the flight procedure and the flight path of the aircraft are also included, the output flight trajectory and the flight procedure protection area picture in fact are the description for the movement process of the aircraft in the flight procedure protection area in the map.

In the synchronization step, an actual visual video 1, a simulation visual video 2 and a complex simulation visual video 3 are temporally synchronized by the synchronization module, and the flight trajectory and flight procedure protection area picture 4 output by the software Google Earth and with the time period corresponding to that of the abovementioned videos is selected.

In the step of playing videos, the actual visual video 1, the simulation visual video 2, the complex simulation visual video 3, and the flight trajectory and flight procedure protection area picture 4 synchronous in the time are simultaneously played through multiple paths of video playing software.

In the above steps, the video source data packets generated by the data processing module in the data processing step are data packets for making 3D dynamic videos through Xplane software.

In the above steps, the time system in the synchronization step is a GPS time system, and the synchronization module extracts GPS time and local time parameters in the videos, and adjusts the starting points of the videos or the images according to the parameters so as to realize the synchronization of the videos or the images.

The method can also be described in another manner the method includes a data processing step, a step of generating flight trajectory and flight procedure protection area pictures, a synchronization step and a playing step; in the parameter collecting step (equivalent to the step of collecting actual visual videos and flight parameters and the step of generating over-limit alarms), actual flight is carried out in an actual location according to the pre-designed flight procedure; during the flight, the image capturing device in the system stores the captured actual vision into the image collection and storage device, and meanwhile, a flight data access recorder records the various flight parameters, wherein the flight procedure comprises a pre-warning height value of the aircraft from a ground object;

in the step of generating simulation visual videos, the various flight parameters recorded by the flight data access recorder are generated into three-dimensional simulation video for the flight of the aircraft;

in the step of generating complex video images, the actual visual video in the image collection and storage device is extracted, the three-dimensional simulation video during the flight of the aircraft is extracted, and the capturing recording time and the flight data recording time are generated into images of the actual visual video and the simulation video of the flight of the aircraft synchronous in time by taking the navigation satellite time as the reference;

in the step of generating flight trajectory pictures: the three-dimensional simulation video of the flight of the aircraft is extracted according to the synchronization starting point and the flight parameters, and the two-dimensional flight path picture with the flight path of the aircraft and the position of the aircraft is generated;

in the play and verification step, the actual visual video, the three-dimensional simulation video and the two-dimensional flight path picture temporally synchronous are simultaneously played on three display pictures, and an alarm will be given if the flight height value exceeds the pre-warning height value.

Wherein, the step of generating flight trajectory pictures and the play and verification step are equivalent to the data processing step, the step of generating flight trajectory and flight procedure protection area pictures, the synchronization step and the playing step;

The step of generating three-dimensional simulation videos of flights of the aircraft includes: generating the flight simulation videos with quantized indicator, generating the video data packets which can be treated by software Google Earth and generating 3D image, generating the video data packets which can be treated by Xplane software and generating complex flight simulation.

Wherein, the navigational satellite time is a GPS time system.

Wherein, the various flight parameters comprise flying height, operating parameters, and weather parameters.

Wherein, the actual flight path image is the actual environmental image observed by the pilot.

What is claimed is:

1. A system for inspecting and validating a flight procedure, comprising an image capturing apparatus, a storage device, a playing device, and a recorder, characterized in that the system is further provided with a data processing module for processing flight data extracted by the recorder and a synchronization module for synchronizing video files temporally; the image capturing apparatus is equipped on an aircraft, and is connected with the storage device; the recorder is connected with the data processing module; the storage device and the data processing module are connected independently with the synchronization module, the synchronization module being connected with the playing device;

wherein the system further comprises a first display screen for displaying images of actual flight paths collected by the image capturing apparatus, a second display screen and a third display screen for displaying images of simulation flight paths generated from the flight data recorded by the recorder, and a fourth display screen for displaying two-dimensional pictures of images of the simulation flight paths; the playing device is independently connected with the first display screen, the second display screen, the third display screen, and the fourth display screen;

wherein the first display screen, the second display screen, the third display screen and the fourth display screen are four display screens disposed on the same wall.

2. The system for inspecting and validating a flight procedure of claim 1, characterized in that the third display screen displays complex flight simulation videos processed and generated by a software, and the fourth display screen displays simulation videos of 3D images processed and generated by another software.

3. The system for inspecting and validating a flight procedure of claim 2, characterized in that the software is Xplane.

4. The system for inspecting and validating a flight procedure of claim 2, characterized in that the another software is Google Earth.

5. A method for validating a flight procedure applied in the system of claim 1, comprising the step of collecting actual visual videos and flight parameters, the step of generating simulation visual videos, the step of generating over-limit alarms, the step of processing data, the step of generating complex simulation visual videos, the step of generating flight trajectory and flight procedure protection area pictures, the step of synchronizing the actual visual videos, the simulation visual videos, and the complex simulation visual videos, and the step of playing the actual visual videos, the simulation visual videos, and the complex simulation visual videos;

in the step of collecting actual visual videos and flight parameters, actual flight is carried out at an actual location according to a pre-designed flight procedure; during the flight, the image capturing apparatus in the system stores captured actual visual videos into the storage device, and meanwhile, the recorder records various flight parameters;

in the step of generating simulation visual videos, the data processing module in the system extracts the flight parameters recorded in the recorder, decoding processing software of the recorder makes simulation videos of actual flights of an aircraft, and actual flight parameters are embedded in the simulation videos, so that the flight parameters are visible in the video;

in the step of generating over-limit alarms, the data processing module in the system extracts the flight parameters recorded in the recorder, the actual flight parameters are compared with standard parameters preset in the flight procedure, alarms are generated by the flight parameter alarm function of the decoding processing software of the recorder, and the alarms are embedded into the simulation videos, so that the alarms are visible in the simulation visual videos;

in the data processing step, the data processing module generates, by the decoding processing software of the recorder, video source data packets used for making composite flight simulation videos and image source data packets used for processing and generating 3D images by software Google Earth or other software;

in the step of generating composite simulation visual videos, the data processing module in the system extracts the video source data packets, and composite simulation visual videos with view angles adjustable are generated by simulation flight software;

in the step of generating flight trajectory and flight procedure protection area pictures, the data processing module in the system extracts the image source data packets, 3D image files with actual flight trajectories are generated by software Google Earth or other software, and protection areas set in a flight procedure are marked in the 3D images to generate pictures containing the actual flight trajectories and the flight procedure protection areas;

in the synchronization step, the synchronization module synchronizes the actual visual videos, the simulation visual videos and the composite simulation visual videos temporally, and selects the flight trajectory and the flight procedure protection area pictures output by the software Google Earth or other software in the time period corresponding to that of the actual visual videos, the simulation visual videos and the composite simulation visual videos;

in the playing step, the actual visual videos, the simulation visual videos, the composite simulation visual videos and the simulation visual pictures temporally synchronized by a multi-path video player software are simultaneously played.

6. The method of claim 5, characterized in that the video source data packets generated by the data processing module in the step of processing data are data packets used for making a 3D dynamic video by Xplane software or other software.

7. The method of claim 5, characterized in that a time system used in the step of synchronizing the actual visual videos, the simulation visual videos, and the complex simulation visual videos is a GPS time system, and the synchronization module extracts GPS time and local time parameters in the actual visual videos, the simulation visual videos, and the complex simulation visual videos, and starting points of the actual visual videos, the simulation visual videos, and the complex simulation visual videos or the images are adjusted according to the parameters to realize the synchronization of the actual visual videos, the simulation visual videos, and the complex simulation visual videos or the images.

8. The system for inspecting and validating a flight procedure of claim 1, characterized in that the recorder is a Quick Access Recorder.

* * * * *